United States Patent
Chawla et al.

[11] Patent Number: 6,137,787
[45] Date of Patent: Oct. 24, 2000

[54] METHOD AND APPARATUS FOR RESOURCE ASSIGNMENT IN A WIRELESS COMMUNICATION SYSTEM

[76] Inventors: Kapil K. Chawla, 2216 Knollwood Dr.; Xiaoxin Qiu, 2111 Knollwood Dr., both of Middletown, N.J. 07748

[21] Appl. No.: 08/832,546

[22] Filed: Apr. 3, 1997

[51] Int. Cl.[7] .............................. H04B 7/212; H04J 3/00
[52] U.S. Cl. .............................. 370/337; 455/447
[58] Field of Search .................... 370/229, 230, 370/231, 370, 389, 321, 329, 337, 336, 341, 347, 349, 442, 477, 468; 455/62, 63, 447, 450, 453, 403, 422, 446, 524, 525, 103, 132, 166.2, 168.1, 179.1, 180.1

[56] References Cited

U.S. PATENT DOCUMENTS

| | | | |
|---|---|---|---|
| 4,144,411 | 3/1979 | Frenkiel | 455/447 |
| 5,185,739 | 2/1993 | Spear | 370/337 |
| 5,193,091 | 3/1993 | Crisler et al. | 370/336 |
| 5,301,188 | 4/1994 | Kotzin et al. | 455/447 |
| 5,355,367 | 10/1994 | Comroe et al. | 370/329 |
| 5,430,761 | 7/1995 | Bruckert et al. | 455/63 |
| 5,485,463 | 1/1996 | Godoroja | 370/336 |
| 5,507,034 | 4/1996 | Bodin et al. | 455/452 |
| 5,613,194 | 3/1997 | Olds et al. | 455/429 |
| 5,678,187 | 10/1997 | Meidan et al. | 455/63 |
| 5,710,976 | 1/1998 | Hill et al. | 455/62 |
| 5,737,358 | 4/1998 | Ritz et al. | 370/341 |
| 5,802,173 | 9/1998 | Hamilton-Piercy et al. | 455/561 |
| 5,805,633 | 9/1998 | Uddenfeldt | 370/337 |
| 5,844,894 | 12/1998 | Dent | 370/330 |

*Primary Examiner*—Dang Ton
*Assistant Examiner*—Phirin Sam

[57] ABSTRACT

A method and apparatus for assigning communication resources for at least one communication site in a time division communication system having multiple reuse patterns in the time domain. A first plurality of communication sites communicate using a first portion of a time frame corresponding to a first reuse pattern. A second plurality of communication sites communicate using a second portion of said time frame corresponding to a second reuse pattern.

36 Claims, 8 Drawing Sheets

K = 4

K = 7

K = 12

$k = i^2 + ij + j^2 = 19$

K=4, GAMMA=4, SIGMA=6db, SITE SELECTION
DETECTION THRESHOLD=15dB
CLASSIFYING THRESHOLD=12dB
FTB OF TERMINAL=15dB
ANTENNA BEAMWIDTH=50 DEG.
SLOTS/FRAME/SECTOR=50
SQUARE ROOT POWER CONTROL

NUMBER OF TERMINALS/SECTOR=100
NUMBER OF DATA TERMINALS/SECTOR=90
NUMBER OF VOICE TERMINALS/SECTOR=10

K=4, GAMMA=4, SIGMA=6db, SITE SELECTION, SQUARE ROOT POWER CONTROL
DETECTION THRESHOLD=15dB
CLASSIFYING THRESHOLD=12dB
FTB OF TERMINAL=15dB
ANTENNA BEAMWIDTH=50 DEG.
SLOTS/FRAME/SECTOR=50
NUMBER OF TERMINALS/SECTOR=100
NUMBER OF DATA TERMINALS/SECTOR=90
NUMBER OF VOICE TERMINALS/SECTOR=10

K=4, GAMMA=4, SIGMA=6db, SITE SELECTION, SQUARE ROOT POWER CONTROL
DETECTION THRESHOLD=15dB
CLASSIFYING THRESHOLD=12dB
FTB OF TERMINAL=15dB
ANTENNA BEAMWIDTH=50 DEG.
SLOTS/FRAME/SECTOR=50
NUMBER OF TERMINALS/SECTOR=100
NUMBER OF DATA TERMINALS/SECTOR=90
NUMBER OF VOICE TERMINALS/SECTOR=10

K=4, GAMMA=3, SIGMA=6db, SITE SELECTION, SQUARE ROOT POWER CONTROL
DETECTION THRESHOLD=15dB
CLASSIFYING THRESHOLD=12dB
FTB OF TERMINAL=15dB
ANTENNA BEAMWIDTH=50 DEG.
SLOTS/FRAME/SECTOR=50
NUMBER OF TERMINALS/SECTOR=100
NUMBER OF DATA TERMINALS/SECTOR=90
NUMBER OF VOICE TERMINALS/SECTOR=10

K=4, GAMMA=4, SITE SELECTION, SQUARE ROOT POWER CONTROL
DETECTION THRESHOLD=15dB
CLASSIFYING THRESHOLD=12dB
FTB OF TERMINAL=15dB
ANTENNA BEAMWIDTH=50 DEG.
SLOTS/FRAME/SECTOR=50
NUMBER OF TERMINALS/SECTOR=100
NUMBER OF DATA TERMINALS/SECTOR=90
NUMBER OF VOICE TERMINALS/SECTOR=10

METHOD AND APPARATUS FOR RESOURCE ASSIGNMENT IN A WIRELESS COMMUNICATION SYSTEM

FIELD OF INVENTION

The invention relates to a wireless communication system. More particularly, the invention relates to a time division wireless communication system having multiple reuse patterns in the time domain and a scheduling scheme for assigning those patterns, which scheme provides high system throughput and guarantees Quality of Service (QoS), while also being flexible, fair and demand driven.

BACKGROUND OF THE INVENTION

Spurred by the growth of the Internet, the trend towards telecommuting, the pace of telecommunication de-regulation, and various other factors, broadband access to the home has received an increasing amount of attention. In view of this attention, the telecommunication industry has been attempting to provide a communication system architecture and access scheme which is capable of delivering this range of new applications to the consumer, unfortunately, without much success.

One reason for this lack of success is the high bandwidth required to deliver these types of services. Bandwidth is a key limiting factor in determining the amount of information a system can transmit to a user at any one time. Bandwidth refers to the difference between the two limiting frequencies of a band expressed in Hertz (Hz). Although varying with application, effective broadband communication requires a bandwidth sufficient to permit a data rate in the range of several tens of mega-bits per second (Mbps).

Traditional wired communication systems using modems and a transmission medium such as twisted pair copper wire cannot currently achieve the data rates necessary to deliver high-speed applications due to bandwidth limitations. In an attempt to solve this bandwidth problem, the local exchange companies (LECs) have been engaged in planning and deploying hybrid fiber/co-ax (HFC), asymmetric digital subscriber line (ADSL) and switched digital video (SDV) networks. These wired-network approaches to providing high-speed access, however, require a substantial market penetration to keep per-subscriber costs at an acceptable level due to the high costs involved.

Similarly, traditional wireless systems such as narrowband cellular and Personal Communication Services (PCS) are bandwidth limited as well. This is especially true for wireless systems using lower frequencies (2–3 Ghz) where the bandwidth resource (i.e., frequency spectrum) is very limited. As an alternative, wireless solutions such as Multichannel Multipoint Distribution Service (MMDS) have become attractive for low take-rate scenarios, e.g., a market penetration of a few percent. The benefit of wireless systems for delivering high-speed applications is that they can be deployed rapidly without installation of local wired distribution networks. Even for these systems, however, there is a need for efficient use of the available bandwidth, in order to support the high data rate applications.

A traditional solution for increasing the bandwidth efficiency in wireless systems is through frequency reuse. Frequency reuse refers to reusing a common frequency band in different cells within the system. The concept of frequency reuse will be discussed in more detail with reference to FIGS. 1 and 2.

A typical wireless communication system includes a plurality of communication sites, such as mobile telephone switching office (MTSO), base stations, terminal stations, or any other site equipped with a radio transmitter and/or receiver.

FIG. 1 is a diagram of a typical wireless communication system. FIG. 1 shows a base station 20 in wireless communication with terminal stations 22. Base station 20 is usually connected to a fixed network, such as the public switched telephone network (PSTN) 24 or the Internet. Base station 20 could also be connected to other base stations, or connected to a MTSO and then PSTN 24 in the case of mobile systems. Terminal stations 22 can be either fixed or mobile.

Base station 20 communicates information to/from terminal stations 22 using radio signals transmitted over a range of carrier frequencies. Frequencies represent a finite natural resource, and are in high demand. Moreover, frequencies are heavily regulated by both Federal and State governments. Consequently, each cellular system has access to a very limited number of frequencies. Accordingly, wireless systems attempt to reuse frequencies in as many cells within the system as possible.

To accomplish this, a cellular system uses a frequency reuse pattern. A major factor in designing a frequency reuse pattern is the attempt to maximize system capacity while maintaining an acceptable signal-to-interference ratio (SIR). SIR refers to the ratio of the level of the received desired signal to the level of the received undesired signal. Most of the undesired signal is due to co-channel interference. Co-channel interference is interference due to the common use of the same frequency band by two different cells.

To implement frequency reuse, a cellular system takes the total frequency spectrum allotted to the system and divides it into K sets of frequencies. For example, if the system were allocated 50 MHZ of frequency spectrum, and there were 5 sets of frequencies (K=5), each set would include 10 MHZ worth of the 50 MHZ available to the system (assuming a uniform distribution). FIGS. 2(A) through 2(D) illustrate examples of frequency reuse patterns corresponding to K=4, 7, 12 and 19, respectively.

A cellular communication system has a number of communication sites located throughout the geographic area served by the system. As shown in FIGS. 2(A) through 2(D), this geographic area is organized into cells and/or sectors, with each cell typically containing a plurality of communication sites such as a base station and terminal stations. A cell is represented in FIGS. 2(A) through 2(D) as a hexagon. FIG. 2(A) shows a frequency reuse pattern where K=4. Cells are placed into groups of four, with each group employing one of the frequency sets 1 through 4 (the number within each cell in FIG. 2(A) represents a set of frequencies). This group of four cells is then repeated until the entire service area is covered. This same pattern is shown in FIGS. 2(B), 2(C) and 2(D) for groups of 7, 12 and 19 cells, respectively.

In order to increase spectrum efficiency, some cellular systems have employed multiple frequency reuse patterns within the same system. For example, U.S. Pat. No. 4,144, 411 issued to Frenkiel on Mar. 13, 1979, teaches static reuse of frequencies in a system employing a miniature-sized overlay in each cell, with the miniature-sized overlay using the same type of reuse pattern as the large cell reuse pattern. The result is that the miniature-sized reuse pattern and the large-cell patterns are both on seven-cell repeat patterns. This is achieved through yet lower transmit powers and maintaining the same site spacing to cell radius as the large-cell. This concept is typically referred to as cell splitting.

An enhancement to Frenkiel is discussed in an article authored by Samuel W. Halpern entitled Reuse Partitioning in Cellular Systems, presented at the 33rd IEEE Vehicular Technology Conference on May 25–27, 1983 in Toronto, Ontario, Canada. The Halpern article sets forth a cellular system having multiple frequency reuse levels (or patterns) within a given geographical area. For example, a cluster of cells normally employing a seven-cell reuse pattern may simultaneously operate on a three-cell reuse pattern and a nine-cell reuse pattern. One set of frequencies is dedicated to the three-cell reuse pattern while another set of frequencies is dedicated to the nine-cell reuse pattern. Generally, the principle behind the Halpern system is to allow a degradation of carrier-to-interference (C/I) performance for those subscriber units that already have more than adequate C/I protection while providing greater C/I protection to those subscribers that require it. Therefore, a subscriber with the best received signal quality will be assigned to the set of channels for the three-cell reuse pattern since they are able to tolerate more co-channel interference than a subscriber whose signal quality is poorer. The subscriber having the poorer received signal quality is therefore assigned to a channel correspondent to the nine-cell reuse pattern.

The Halpern system, as well as the previous multiple frequency reuse partitioning systems, however, are unsatisfactory for a number of reasons. For example, in practice, the Halpern system permits only a small fraction of the total traffic to use the closer reuse pattern for the miniature-sized overlay, thus leading to little or no gain in capacity for the system. Further, the Halpern system is designed for circuit switched systems, and not for the modern packet switched systems. More specifically, circuit switched systems can tolerate a lot of measurement overhead and delay when connecting to the user. If the same techniques were applied to a packet switched system, however, these techniques would require several measurements before transmitting each packet. The overhead and delay introduced would be excessive, and therefore this real time measurement intensive method described in the Halpern reference would not be feasible. In fact, the Halpern method is designed for the conventional telephony system, and not packet switched systems in general.

Moreover, these previous systems were designed to do the reuse partitioning in the frequency domain, that is they were focused on dividing the total frequency bandwidth available to the system and allocating one portion of this total frequency bandwidth to one reuse pattern, and another portion to another reuse pattern.

Dividing the available frequency, however, limits the maximum data rate that can be provided to any single user or application by the system. Therefore, frequency reuse partitioning schemes are not suitable for supporting high data rate applications such as those envisioned for wireless broadband systems.

A specific implementation of frequency reuse partitioning is disclosed in U.S. Pat. No. 5,038,399 (the "Bruckert patent"). The Bruckert system is directed towards a mechanism for measuring various signal strengths from base stations and subscriber stations throughout the system, constructing a reuse level gradient, and using this gradient as a basis for switching between multiple frequency reuse patterns.

As with the Halpern system, the Bruckert system is unsatisfactory for a number of reasons. For example, the Bruckert patent is also targeted towards a circuit switched system and is not designed towards modern packet switched systems. Furthermore, the Bruckert patent describes a method for assigning different users to different reuse levels according to the "reuse level gradient," which is another way of stating the assignment is based upon different interference levels. In many instances, however, an integrated system providing different services to the same user may require different reuse levels due to their differing service requirements, even though they experience the same interference. The Bruckert patent fails to disclose how the quality of service (QoS) is maintained for each application using this method. In addition, the Bruckert patent fails to disclose any techniques for ensuring fairness among communication sites in terms of each site gaining access to the communication resource in a uniform manner. Finally, the Bruckert patent fails to disclose the use of multiple reuse patterns in the time domain, as with the previously discussed systems.

In view of the foregoing, it is clear that a substantial need exists for a scheduling scheme for use with a wireless communication system which provides high system throughput and guarantees QoS, while also being flexible, fair and demand driven

SUMMARY OF THE INVENTION

These needs and other needs are met by a method and apparatus for assigning communication resources for at least one communication site in a time division communication system having multiple reuse patterns in the time domain. A first plurality of communication sites communicate using a first portion of a time frame corresponding to a first reuse pattern. A second plurality of communication sites communicate using a second portion of said time frame corresponding to a second reuse pattern.

More particularly, one embodiment of the invention uses a categorization procedure to help match a terminal and application, wherein an application may have a varying Quality of Service requirement, to an appropriate reuse pattern. Examples of applications having varying Quality of Service requirements include voice and data services. According to this procedure, the terminals are separated into categories based upon initial and ongoing measurements. Depending upon the specific application and the category of the terminal, the terminal is then assigned to one of the two reuse patterns.

With these and other objects, advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
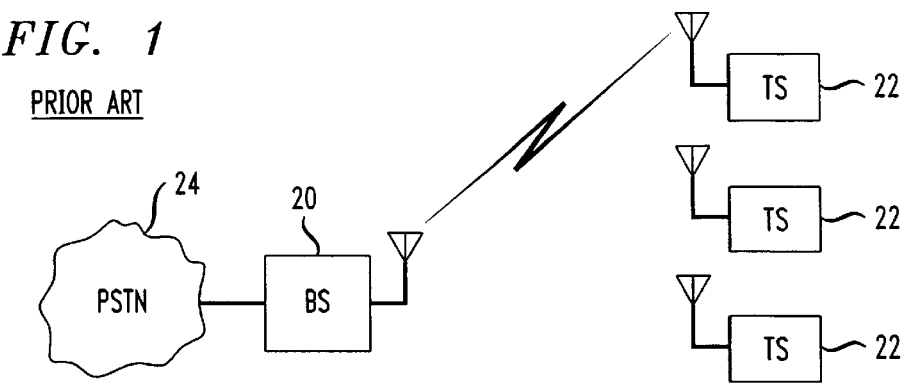
FIG. 1 is a diagram of a typical wireless communication system.
Figure 2A:
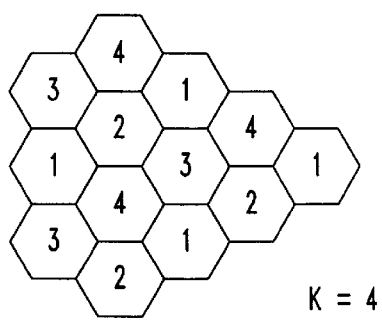
FIGS. 2(A) through 2(D) illustrate examples of frequency reuse patterns of K=4, 7, 12 and 19.
Figure 2B:
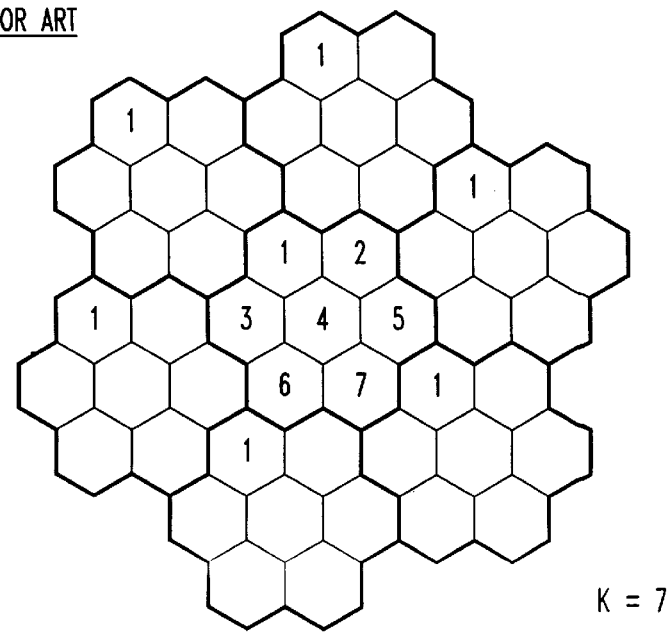
Figure 2C:
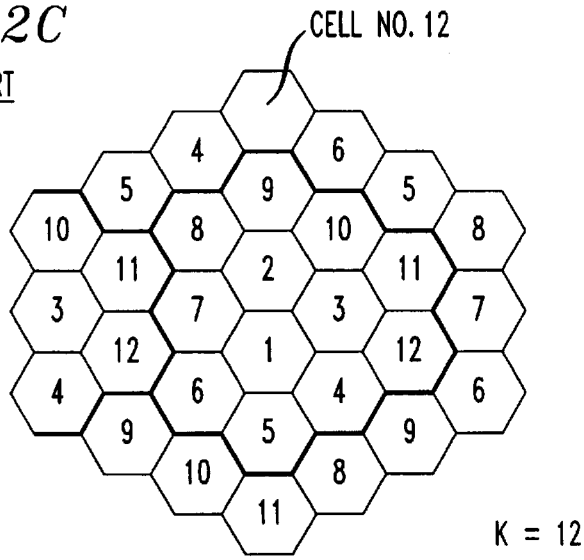
Figure 2D:
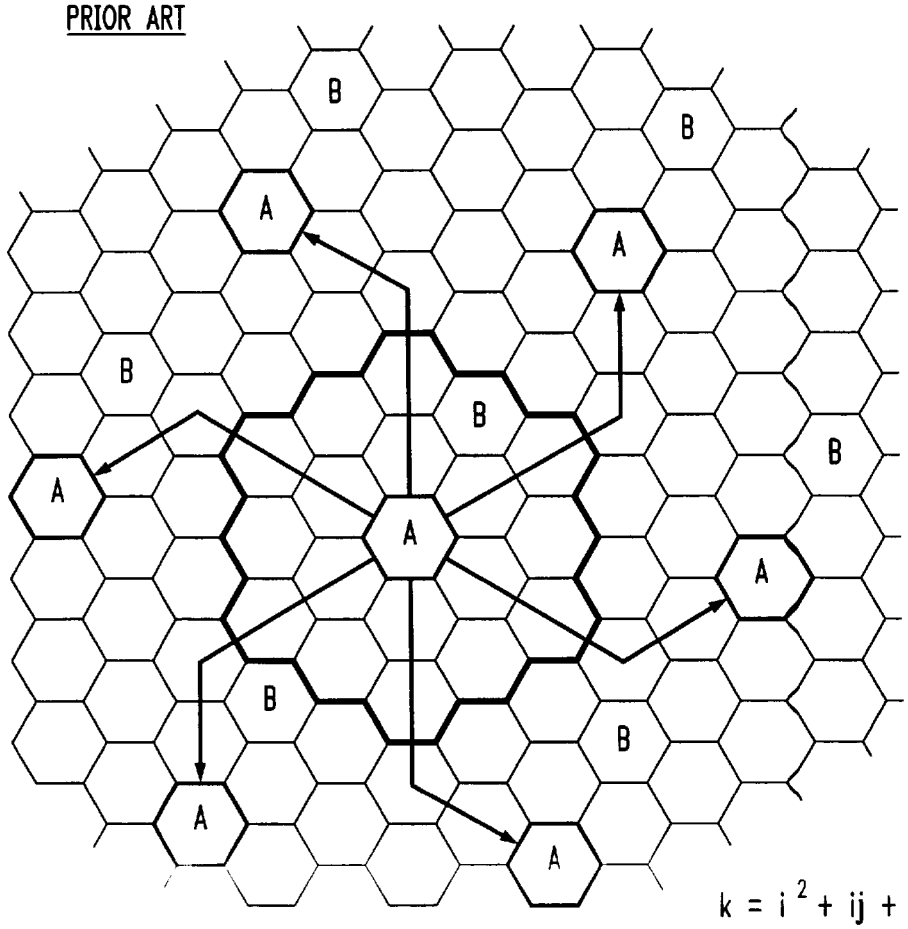

This section describes in detail a Time Slot Reuse Partitioning (TSRP) scheme for use in a time division multiplexed system. More particularly, TSRP is a scheduling scheme which coordinates the assignment of time slots for use by communication sites served by the system for transmitting and receiving information. In TSRP, each time slot belongs to a predetermined reuse pattern in the time domain, and the time slot assignment is based upon the interference tolerance of the terminal and the QoS requirement of the application. The term application as used herein refers to a type of service being provided by the system, such as voice or data. TSRP is particularly well-suited for wireless systems that find it necessary to: (1) offer different applications with differing QoS requirements; or (2) ensure similar performance across terminals for a particular application.

Before describing the TSRP scheme in further detail, it is worthy to note that the term communication sites as used herein includes any fixed or mobile site having either a transmitter or receiver, or both. Thus, the term communication site includes both base stations and terminal stations. The term terminal stations includes fixed terminal stations such as residential or business phones. Although the embodiment described herein assumes a fixed wireless system, it can be appreciated that a mobile wireless system falls within the scope of the invention as well. In the case of mobile systems, the term terminal stations includes mobile terminal stations such as portable telephones, transportable phones, car telephones, hand-held telephones, pocket telephones, pagers, personal computers, laptop computers, notebook computers, facsimile machines, personal information managers, and so forth.

In designing a scheduling scheme for a wireless broadband communication system, desirable performance goals include high information throughput and robustness, while also ensuring that the scheme meets the following three criteria: (1) flexibility; (2) QoS Guaranteed; and (3) fairness. The scheme must be flexible since it must easily adapt to given base station locations, cell sizes, cell configurations, and to the specific propagation environment. The scheme must have QoS guarantees because the scheme must offer the ability to provide differing QoS depending upon the specific application. Finally, the scheme must be fair to ensure that the same applications at different terminals get similar QoS. TSRP is designed to operate with these desirable performance goals in mind.

The design of the TSRP scheme was driven by several problems inherent in traditional wireless broadband systems, as perceived by the inventors of the TSRP scheme. The first problem is how to deal with inter-cell interference without having the luxury of real-time coordination between different base stations (the use of a central controller is unattractive given its excessive communication bandwidth and central processing requirements). A second problem is that the interference received at, and caused by, different terminals can be vastly different, depending upon their location. A third problem is that the scheme needs to provide differing levels of performance at a given terminal as different applications have different QoS requirements.

Various techniques may be used to construct a solution. One physical layer technique to address these problems is to use different channel coding schemes for different terminals or applications. More powerful coding schemes may be used for terminals with higher interference, and for applications with more stringent QoS requirements. The specific code used may be negotiated when a terminal requests an application, and the choice of the code may take into account the previous performance measurements at the terminal and the base. A similar technique that is based upon adaptive modulation has been suggested for Universal Mobile Telecommunication Systems (UMTS)in the Advanced Time Division Multiple Access (ATDMA) project. A link layer technique that addresses some of these problems is suggested in a known Capture Division Packet Access (CDPA) scheme, in the context of mobile cellular systems. In this CDPA scheme (with frequency reuse of one), no attempt is made to coordinate transmissions in different cells. Instead, the transmission failures due to interference are taken care of by higher layer protocols such as Automatic Repeat Request (ARQ). This technique, however, may introduce delays and therefore may not be able to guarantee the QoS for certain applications. Moreover, all of the above techniques in general provide less than desirable results in comparison with the approach taken in the present invention.

By way of contrast, the TSRP scheme in accordance with the present invention uses a system planning approach to address these issues. TSRP is based upon two key ideas. First, the system using TSRP is to have more than one coexisting reuse pattern in the time domain. Second, a terminal or application is matched to an appropriate reuse pattern, so as to guarantee the QoS.

In one embodiment of the invention, two types of applications are considered. The first is voice communication. Voice communication is representative of a real-time application with a stringent QoS requirement. The second application is data communication. Data communication is representative of a non-real time application with a best-effort requirement.

A typical system used in accordance with an advantageous embodiment of the invention is assumed to be a fixed, broadband, packet-switched wireless system employing the same frequency band in every cell and multiple reuse patterns in the time domain. In order to support the high bit rate, it is desirable that each cell have the ability to fully use the allocated spectrum, rather than splitting this spectrum into separate frequency channels, and assigning only a few of these to each cell. Therefore a Time Division Multiple Access (TDMA) system is assumed, with the system having a frequency reuse of one. The system uses both a 1-cell reuse (K=1) pattern and a 4-cell reuse (K=4) pattern in the time domain. Further, the system is capable of dynamically assigning users to time slots corresponding to different reuse patterns. The access portion includes at least one fixed terminal station communicating with a serving base station. It is also assumed that each cell is divided into six 60 degree sectors, with the sector antennas co-located with the base station serving the cell. The terminal stations have directional antennas that may be installed, for example, on the roof-tops of houses. At installation, these antennas can be pointed in the direction of the "best" measured signal. In addition, time is divided into fixed length time-frames and each time-frame in turn is divided into a fixed number of slots. Each slot can carry a "packet" of data. The base stations are frame and slot synchronized.

It is worthy to note that although specific reference is made to "cells" and "sectors" within this embodiment of the invention, it can be appreciated that both terms refer to the division of a service area for a wireless system. In this respect, the techniques applied herein at a cell level and a sector level are interchangeable depending on the perspective of the system designer. Thus, for example, a system designer could divide a service area into cells exclusively, sectors exclusively, or both, and still fall within the scope of the invention.

Each base station has a controller that can schedule transmissions on a slot-by-slot basis for each sector within the same cell. The controller includes a processor of sufficient processing speed, and sufficient memory to serve the processor and software routines. Note, however, that there is no real-time coordination of the transmissions between different base stations.

To make the above-referenced system more specific, a downlink transmission rate of 10 Mbps is assumed. Each time frame is of length 10 ms, and consists of 100 time slots. Therefore, each time-slot has 1000 bits. In the case of the data application, the payload of a time slot is a single data packet. It is worthy to note that an Asynchronous Transfer Mode (ATM) frame is 424 bits, so the 1000 bits can correspond to two ATM frames or a Rate ½ coded ATM frame with a physical layer header. Assume that the voice vocoder rate is 16 kilo-bits per second (Kbps), and that after channel coding, the effective voice bit rate is 25 Kbps. This corresponds to 250 bits in each time frame. Therefore, in the case of the voice application, up to 4 voice packets may be multiplexed into a time slot, as shown in FIG. 3.

Figure 3:
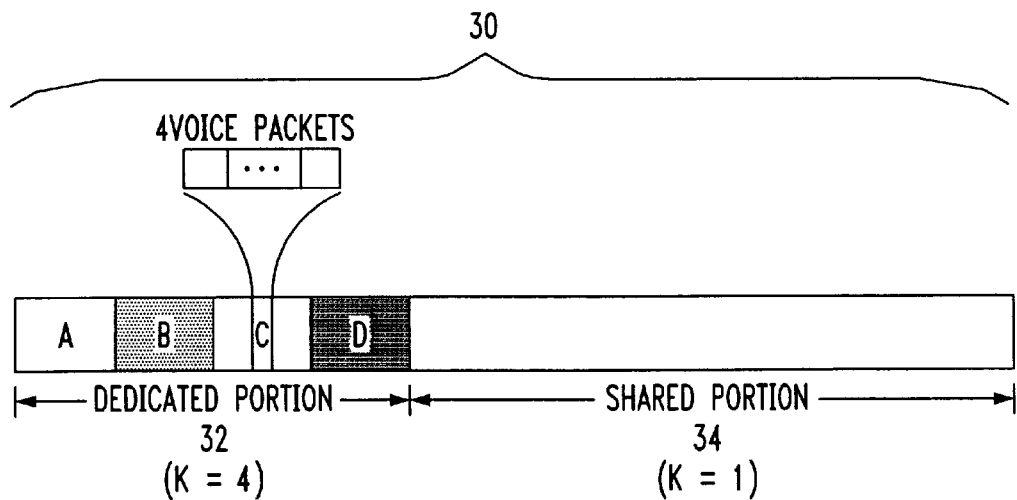
FIG. 3 shows a basic frame structure for Time Slot Reuse Partitioning (TSRP) used in accordance with one embodiment of the invention.

FIG. 3 shows a basic frame structure for TSRP used in accordance with one embodiment of the invention. A frame 30 is divided into two portions: a "dedicated" portion 32 and a "shared" portion 34. Dedicated portion 32 is further divided into subframes, labeled as A, B, C and D. Each subframe has multiple time slots. Shared portion 34 is also divided into multiple time slots. The payload of a single time-slot may be a data packet, or several multiplexed voice packets. With respect to voice applications, a time slot can typically carry up to 4 multiplexed voice packets, as shown in FIG. 3. This assumes that the bit rate for voice is expected to be smaller than the bit rate for data.

Shared portion 34 of frame 30 corresponds to a K=1 time domain reuse pattern, so that every cell can use this portion of the frame. Dedicated portion 32, which corresponds to a K=4 time domain reuse pattern, is further divided into 4 subframes, labeled A, B, C and D. Each base station is assigned one of the 4 dedicated subframes, and this assignment follows (for ideal cell placements) the classical K=4 reuse pattern.

Figure 4:
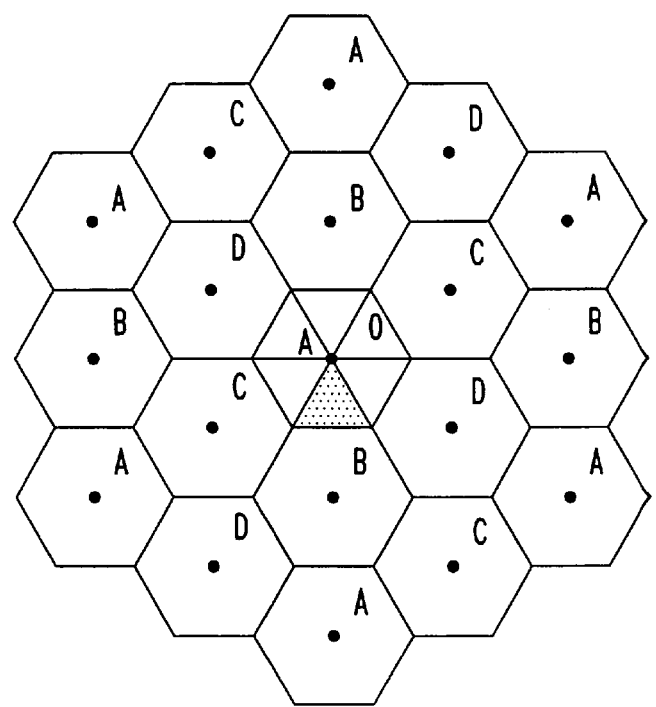
FIG. 4 shows a cellular map of a k=4 reuse pattern used in accordance with one embodiment of the invention.

FIG. 4 shows a cellular map of a K=4 reuse pattern used in accordance with one embodiment of the invention. In FIG. 4, each of the base stations is labeled A, B, C or D, respectively, corresponding to dedicated portion 32 of frame 30 assigned to the base, as shown in FIG. 3.

The target sector (of Base station 0) is shown shaded in FIG. 4. Target sector refers to the sector within which a base station is communicating with a terminal station. FIG. 4 shows the interfering base stations of Cell 0 (center cell) in the first two tiers, i.e., the inner concentric circle of cells around Cell 0 (first tier), and the outer concentric circle of cells around Cell 0 (second tier). A base station is represented by a dot in the center of each cell. Even though not shown explicitly, all the cells where the interfering base stations are located are also six sectored. Each base station is permitted to use the dedicated portion assigned to it, and all of the shared portion. It can be appreciated that for the dedicated potion (of 0), there is no interference from the first tier. The six "co-channel" base stations (labeled A) in the second tier, however, may interfere with the target sector in this portion. On the other hand, in the shared portion, interference may arise from every cell/sector.

The terminal station performance is expected to be much better when it communicates over the dedicated portion, than when it communicates over the shared portion. This allows the base station to compensate the terminals which are located in positions with excessive interference, thus ensuring that similar QoS can be offered to all terminals, independent of location. It also allows the base station to offer different classes of services to a terminal.

In this embodiment, the TSRP scheme uses a categorization procedure to help match a terminal and application to an appropriate reuse pattern. According to this procedure, the terminals are separated into categories based upon initial and ongoing measurements. Depending upon the specific application and the category of the terminal, the terminal is then assigned to one of the two reuse patterns (K=1 or K=4).

At a high level, the following measurements can be used for the categorization. First, measurements of the received power from surrounding base stations/sectors are necessary in order to determine the serving base/sector for the terminal. In addition, measurements of the SIR in the shared subframe and in the dedicated subframe are needed to predict the interference level at the terminal in each of these portions. It is sufficient to just measure the aggregate interference in each case, i.e., it is not necessary to identify the interference arising from each base. Initial measurements may be made during installation, and the system may adapt based on continuing SIR and packet error rate measurements during operation.

In this embodiment, the terminal is assigned one of three categories, numbered from 1 to 3. A "classifying" SIR threshold is used to assign the terminals to categories. The classifying SIR threshold may or may not be the same as the target SIR for acceptable performance. In this embodiment of the invention, the classifying SIR is set to 12 decibels (dB) and the target SIR is set to 15 dB. It is worthy to note that the number of categories, classifying SIR and target SIR are only exemplary parameters. It can be appreciated that a person of ordinary skill in the art could use any number of categories, classifying SIR or target SIR and still remain within the scope of the invention.

The average SIR at the terminal is measured in both the shared and dedicated portions of the time frame. The terminal stations are then categorized as follows:

1. If the average SIR in the shared portion is larger than the classifying threshold, then the terminal is assigned to category 1. It can be appreciated that terminals in this category may use the shared sub-frame and achieve the required SIR on average.
2. Of the remaining terminals, if the average SIR in the dedicated portion is larger than the classifying threshold, then the terminal is assigned to category 2. It can be appreciated that terminals in this category may use the dedicated portion and achieve the required SIR on the average. Further, it is expected that terminals in category 1 should also achieve the required SIR in the dedicated portion. On the other hand, depending upon the traffic load of the nearby cells in the shared portion, terminals in category 2 may also be able to use the shared sub-frame and achieve the required SIR, although not as frequently as those in category 1.

3. Any remaining terminals are assigned to category 3. Terminals in this category have trouble achieving the required SIR in both the shared or the dedicated slots, and may do so only when traffic is very low. In practice, techniques like diversity or more selective antennas may be used at the terminal to enhance the SIR.

In this embodiment, the TSRP scheme also uses a procedure to assign specific time-slots in the frame to an application at a terminal, in part based upon the categorization accomplished above. The following procedure is used for the slot assignment by each base station for a terminal station:

1. Each base station is required to first use its dedicated portion before using the shared portion.
2. Voice terminals have higher priority than data terminals. Voice terminals are first assigned in the dedicated portion. If there are any voice terminals that have not received allocations in the dedicated portion, these terminals get assignments in the shared portion.
3. The data terminals are assigned time-slots after the assignment for voice terminals is complete. Among them, those belonging to category 2 use the dedicated portion with higher priority than those belonging to category 1. The remaining data terminals in categories 1 and 2 get assigned in the remaining shared portion.
4. A round-robin procedure is used in the assignment, to ensure fair access among terminals. For instance, the terminals with the same type of application may be ordered from 0 to N−1, and if terminal i is the last terminal to have access to a time-slot in a given frame, the assignment in the next frame proceeds sequentially (with wrap around) starting with terminal (i+1) mod N. This procedure is carried out for each application group.
5. Each base station coordinates all transmissions in its own sectors so as to ensure that there is no unacceptable interference between transmissions in different sectors. Thus, the intra-cell transmissions are not random, but fully coordinated for high throughput. This can be accomplished using any well-known technique, depending on the throughput requirements for each specific application.

Figure 5:
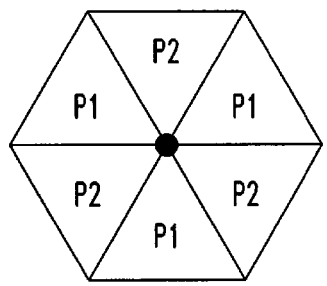
FIG. 5 illustrates a scheme used for intra-cell interference handling in accordance with one embodiment of the invention.

In this embodiment of the invention, the intra-cell assignment procedure is defined as follows:

1. For the given cell, split the dedicated portion and the shared portion into two equal parts (say P1 and P2)
2. This split is done randomly from frame to frame. From the dedicated portion assigned to the base, the base station randomly picks half of the slots. Similarly, it randomly picks half of the slots in the shared portion. The two sets of slots picked (on a frame by frame basis) make up the set P1. The remaining slots assigned to the cell, both in its dedicated portion and the shared portion, make up the set P2.
3. Three of the six sectors are assigned slots P1 and the other three are assigned slots P2 (see FIG. 5).
4. A sector can only transmit in the slots assigned to it for that frame. Thus, a sector can use at most half of the time-slots assigned to the cell.

A simulation was performed to study the performance characteristics of the TSRP protocol. In order to provide a performance baseline for comparison with the TSRP protocol, as well as highlight the advantages of the TSRP protocol, a simple allocation scheme referred to as the Simple Protocol is also simulated.

The Simple Protocol is a scheduling scheme which is designed to operate using the same system requirements and performance goals as the TSRP protocol.

In the Simple Protocol there are no restrictions on the time-slots usable by each base. Each base station may use all the time slots in the time frame. The base station centrally coordinates the transmissions to terminals in its own cell area so that any intra-cell interference is acceptable. Thus, in a multi-sectored base, more than one sector may use the same time-slot, but these simultaneous transmissions to different sectors are coordinated by the base. There is no attempt, however, to coordinate transmissions or avoid interference from other base stations. The base station transmits whenever it has a packet to transmit, and this packet is successfully received as long as the interference from "nearby" base stations is acceptable. Unsuccessful packets are retransmitted using ARQ.

A serious problem with the Simple Protocol scheme is that the bit error rate (BER) performance varies widely across terminals, which translates to differing delays and throughputs for different terminals and therefore a potential unfairness problem. Another related problem is the difficulty in providing QoS guarantees, because the base station cannot ensure that a packet will get through in a given attempt.

A detailed simulation was performed to study the throughput and delay characteristic of the two schemes for data terminals and the packet loss rate for voice terminals. The system configuration and nominal propagation scenario for the simulation were defined as follows. The base stations are located on a uniform (in size) hexagonal grid. Propagation follows a path loss exponent of gamma=4 with lognormal shadowing of sigma=6 dB (sigma denotes the standard deviation of the dB shadowing loss). Fast fading of the signal is not accounted for. This is reasonable based on the expectation that fading is less severe with directional antennas. A static propagation environment is assumed. A square root power control policy is employed, which assumes that the base station transmit power is adjusted to compensate for half of the dB variation in path loss between the base station and the terminal. Receiver thermal noise is not considered. The sector antenna has a beamwidth of 50 degrees and a front to back ratio of 25 dB. The terminal antennas have a beam-width of around 30 degrees, and a front to back ratio of 15 dB. Furthermore, the following settings were used for this simulation:

1. Each sector has 100 terminals, out of which 90 are data terminals and 10 are voice terminals.
2. The data terminals generate packets independently from frame to frame, and independently of the other terminals.
3. The activity of a voice terminal is modeled as a two-state Markov chain. The two states are "talk-spurt" and "silent-gap", with independent, exponential holding times with averages of 1.0 sec and 1.35 sec, respectively.
4. It is assumed that voice packets are generated at the rate of 1 per frame during talkspurts, and that no packets are generated in silent gaps.
5. A voice packet generated is required to be transmitted in the next frame. If the voice packet does not get through successfully, then the packet is dropped and counted as a lost packet. The voice packet loss rate is the ratio of the number of lost (voice) packets to the total number of generated (voice) packets.
6. The time frame consists of 100 slots.
7. As discussed previously, the payload of a time slot may be one data packet, or up to 4 multiplexed voice packets.

8. Two schemes were simulated:
   a. Simple Protocol with square-root power control.
   b. TSRP scheme with square-root power control.
9. In TSRP, 84 slots in each frame are assigned to the shared portion, and the remaining 16 slots are assigned to the dedicated portion. Therefore, each cell is assigned 4 dedicated slots.
10. From the intra-cell assignment procedure described earlier, in TSRP, it follows that each sector is assigned 42 shared slots and 2 dedicated slots in each frame.
11. For the Simple Protocol, each sector is assigned 50 slots per frame.

Figure 6:
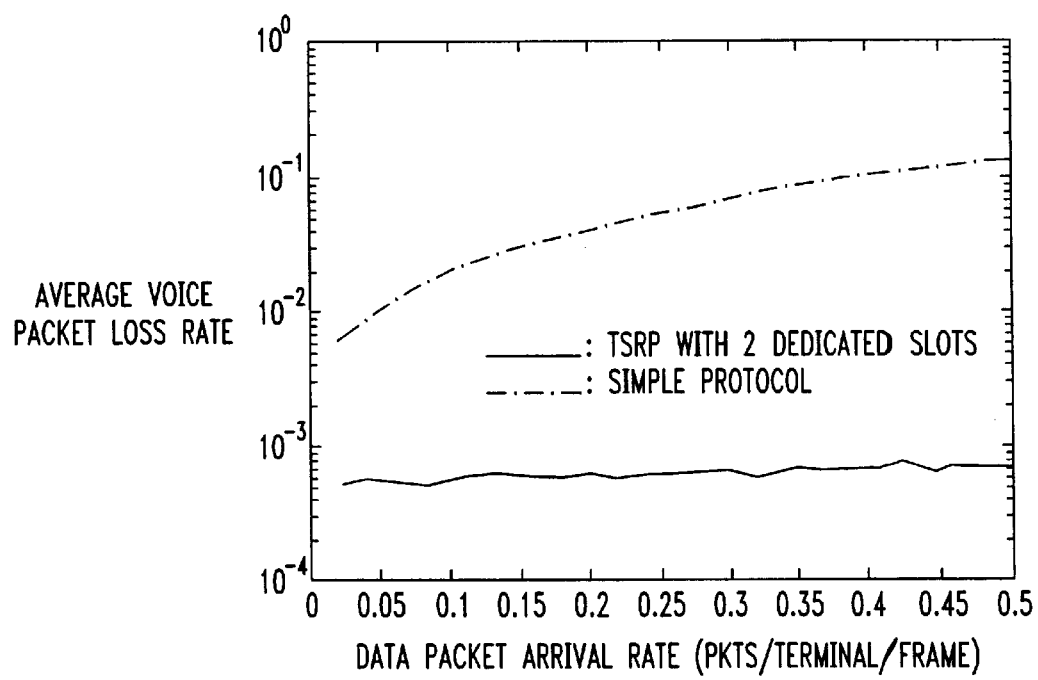
FIG. 6 is a plotting showing the average (over terminals) packet loss rate for voice for the TSRP and Simple protocols.
Figure 7:
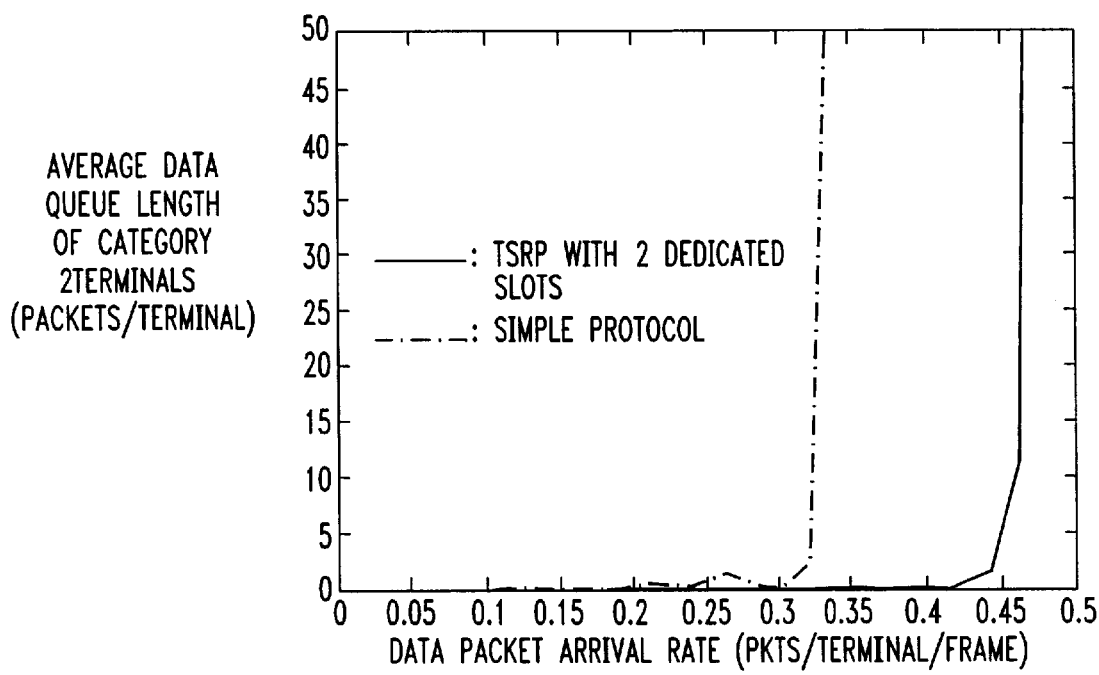
FIG. 7 is a plotting showing the average (over terminals) queue length of data terminals in category 2, as a function of the offered traffic, for the TSRP and Simple protocols.
Figure 8:
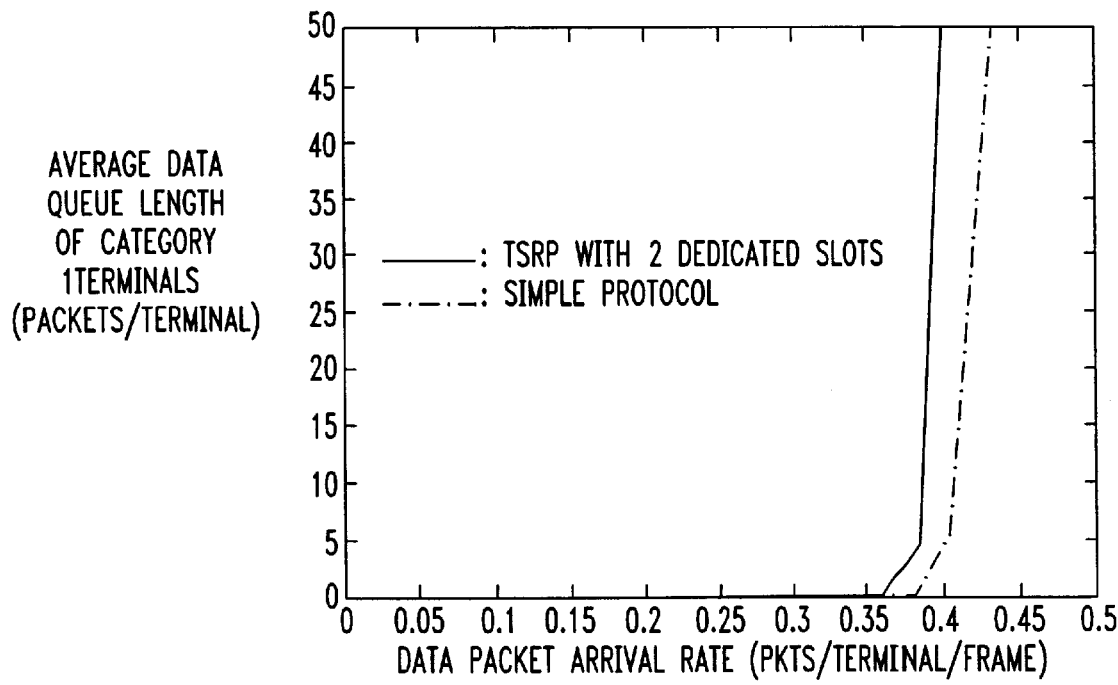
FIG. 8 is a plotting showing the average (over terminals) queue length of data terminals in category 1, as a function of the offered traffic, for the TSRP and Simple protocols.

The results of this simulation for the nominal propagation conditions (gamma=4, sigma=6 dB) are shown in FIGS. 6–8.

FIG. 6 shows the packet loss rate for voice averaged over terminals for the two schemes. From FIG. 6, we see that the voice packet loss rate is around 0.06% for TSRP, essentially independent of the data traffic. For the Simple Protocol, the loss rate increases monotonically with the offered data traffic, from 0.6% to 11%. Assuming that a packet loss rate of less than 1% is required for acceptable quality voice, it follows that TSRP can support the voice traffic independent of the data traffic, but that the Simple Protocol can do so only when the data traffic is very low (less than 0.05 packets/terminal/frame).

FIG. 7 shows the average queue length of data terminals in category 2, as a function of the offered traffic. From FIG. 7, we see that TSRP can support a data rate of 0.44 packets/terminal/frame before the queue length substantially increases. For the Simple Protocol, however, the queue length becomes unacceptable at 0.32 packets/terminal/frame.

FIG. 8 shows the average queue length of data terminals in category 1, as a function of the offered traffic. From FIG. 8, we see that TSRP can support a data rate of 0.38 packets/terminal/frame, but the Simple Protocol can support a data rate of 0.4 packets/terminal/frame.

It was concluded from FIG. 7 and FIG. 8 that the data rate that can be supported by the Simple Protocol is 0.32 packets/terminal/frame, and by TSRP is 0.38 packets/terminal/frame.

Figure 9:
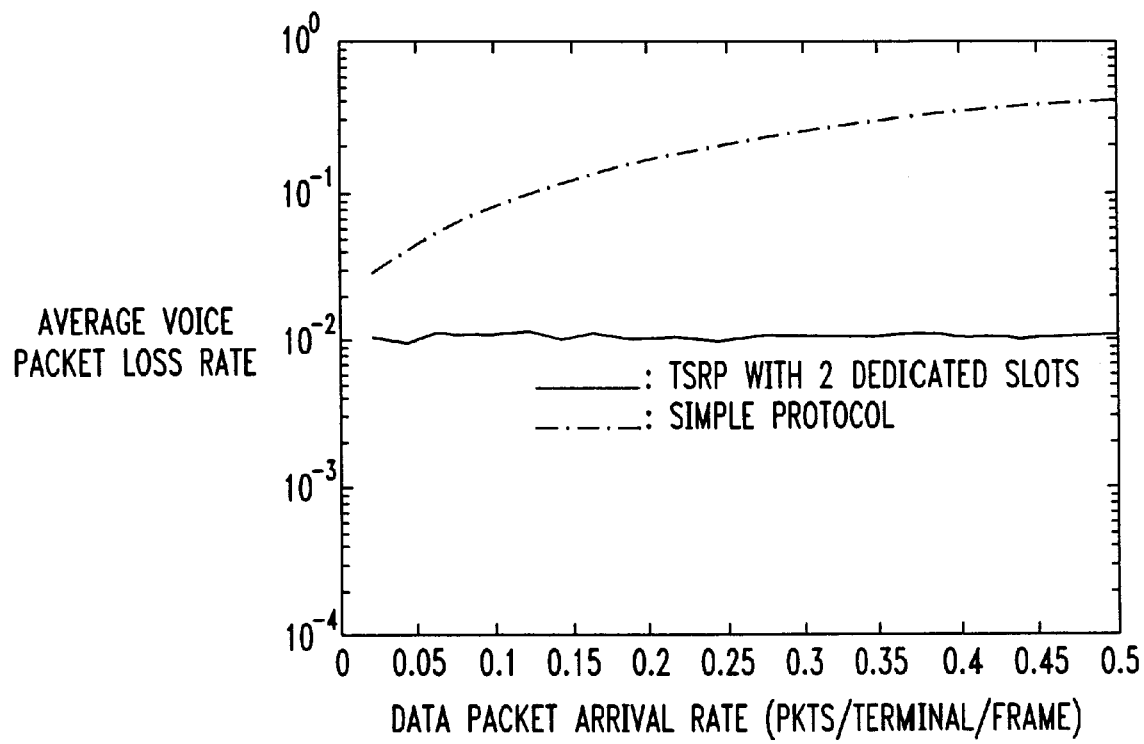
FIG. 9 is a plotting showing the sensitivity of the average voice packet loss to a change in gamma for the TSRP and Simple protocols.

The two schemes were simulated for different propagation scenarios, in order to check the sensitivity to gamma and sigma. FIG. 9, in comparison with FIG. 6, shows the sensitivity of the average voice packet loss to a change in gamma (gamma=3 in FIG. 9, instead of 4). Given that the terminal antennas may be on rooftops and not close to ground (among "clutter"), this setting of gamma is very relevant. As expected, due to the higher interference, the performance of both TSRP and the Simple Protocol is somewhat degraded as compared to the nominal case. With an essentially constant packet loss rate of 1%, however, TSRP still provides acceptable quality. On the other hand, the packet loss rate of the Simple Protocol increases from 3% to 40% as the data traffic increases. For the same propagation assumptions, as far as the data traffic is concerned, the throughput of both schemes is limited by the category 2 terminals to 0.25 packets/terminal/frame.

Figure 10:
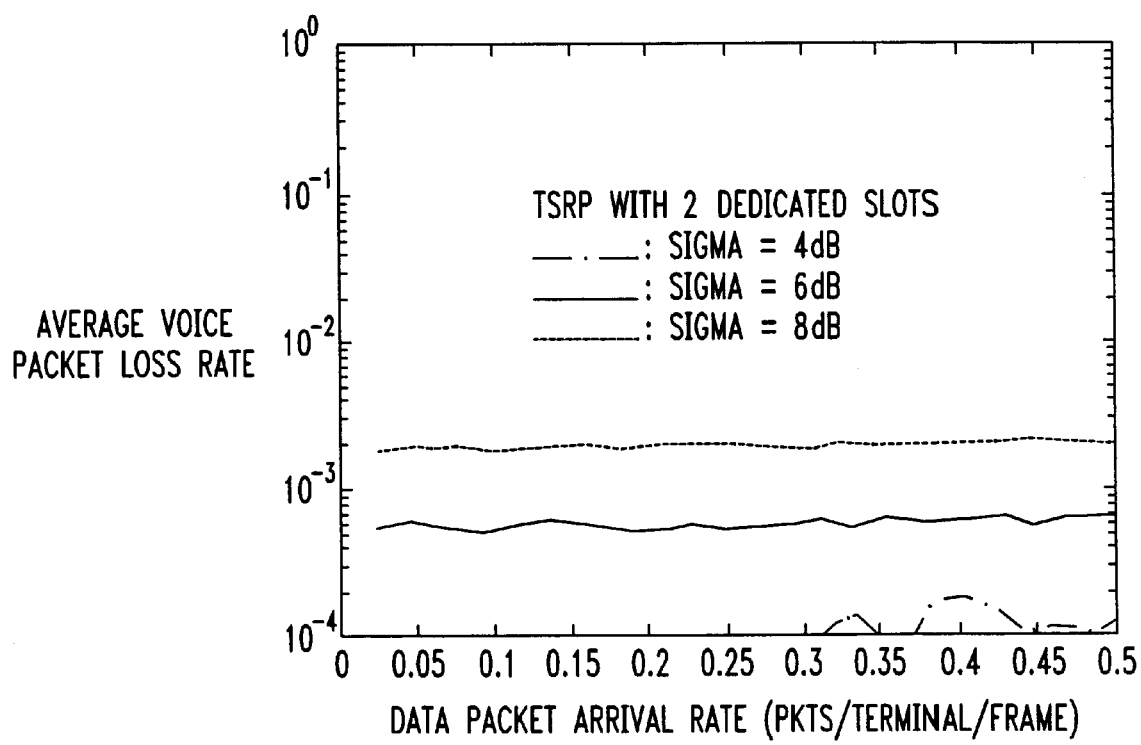
FIG. 10 is a plotting showing the sensitivity of TSRP to a change in sigma in accordance with one embodiment of the invention.

FIG. 10 shows the sensitivity of TSRP to a change in sigma, by comparing the average packet loss for TSRP when sigma changes by ±2 dB to 4 dB and 8 dB, respectively. In all the cases, the voice packet loss probability is well within the target of 1%, and is insensitive to the data traffic. When sigma increases from 4 dB to 8 dB, the maximum acceptable data arrival rate of TSRP decreases from 0.4 packets/terminal/frame to 0.32 packets/terminal/frame.

Although a preferred embodiment is specifically illustrated and described herein, it will be appreciated that modifications and variations of the present invention are covered by the above teachings and within the purview of the appended claims without departing from the spirit and intended scope of the invention. For example, although the TSRP scheme was described in operation with a fixed wireless system, it can be appreciated by a person of ordinary skill in the art that a mobile wireless system falls within the scope of the invention. Furthermore, although the embodiment described herein uses two reuse patterns of K=1 and K=4, it can be appreciated that any number of reuse patterns with any value of K fall within the scope of the invention.

What is claimed is:

1. A method for operating a communication system having multiple reuse patterns in the time domain, comprising the steps of:

communicating with a first plurality of communication sites using a first portion of a time frame corresponding to a first time domain reuse pattern; and communicating with a second plurality of communication sites using a second portion of said time frame corresponding to a second time domain reuse pattern.

2. The method of claim 1, wherein said first portion is a dedicated portion and said second portion is a shared portion.

3. The method of claim 2, wherein said dedicated portion and said shared portion are divided into a plurality of time slots, and further comprising the steps of:

categorizing each communication site according to a classifying signal-to-interference ratio threshold;

assigning each communication site a time slot in said time frame based on said categorization; and communicating information in said assigned time slot.

4. The method of claim 3, wherein each communication site is assigned said time slot in said time frame based on said categorization and an application at each communication site.

5. The method of claim 4, wherein said categorizing step includes measuring an average signal-to-interference ratio for each communication site in both said shared and said dedicated portions of said time frame, and categorizing each communication site by comparing said average signal-to-interference ratio with said classifying signal-to-interference ratio.

6. The method of claim 5, wherein if said average signal-to-interference ratio for a communication in said shared portion is larger than said classifying threshold, then said communication site is assigned to a first category, and if the average signal-to-interference ratio in said dedicated portion is larger than said classifying signal-to-interference ratio, then said communication site is assigned to a second category, with all remaining communication sites assigned to a third category.

7. The method of claim 4, wherein said communication site engaged in said application is assigned said time slot within a portion of said time frame based upon a Quality of Service requirement for said application.

8. The method of claim 7, wherein said communication site engaged in said application requires a more stringent Quality of Service requirement and is assigned a higher priority than a communication site engaged in an application requiring a less stringent Quality of Service requirement.

9. The method of claim 8, wherein said communication sites engaged in said more stringent Quality of Service requirement application are first assigned in said dedicated portion, with any remaining communication sites engaged in said more stringent Quality of Service requirement application assigned in said shared portion.

10. The method of claim 9, wherein said communication sites engaged in said less stringent Quality of Service requirement application are assigned after said communication sites engaged in said more stringent Quality of Service requirement application, with said communication sites engaged in said less stringent Quality of Service requirement application belonging to said second category using said dedicated portion first, with any remaining communications sites engaged in less stringent Quality of Service requirement application in said first and second categories assigned in any remaining shared portion.

11. The method of claim 10, wherein said more stringent Quality of Service requirement application is voice communications, and said less stringent Quality of Service requirement application is data communications.

12. The method of claim 1, further comprising the steps of:
  grouping communication sites by application;
  ordering each communication site within a group;
  prioritizing said groups;
  assigning time slots according to said prioritization of said groups; and
  monitoring assignment of communication sites to time slots and ensuring each terminal has fair access to the communication resource.

13. The method of claim 1, wherein the communication system is a packet-switched system.

14. The method of claim 1, wherein the communication sites are fixed.

15. The method of claim 1, wherein the communication sites are mobile.

16. The method of claim 1, wherein the communication system uses time division multiplexing for the downlink.

17. The method of claim 1, wherein the communication system uses time division multiple access for the uplink.

18. The method of claim 1, wherein a communication site is assigned a reuse pattern which guarantees Quality of Service requirements for each application provided by the system.

19. An apparatus for operating a communication system having multiple reuse patterns in the time domain, comprising:
  means for assigning a first plurality of communication sites to a first portion of a time frame corresponding to a first time domain reuse pattern, and a second plurality of communication sites to a second portion of said time frame corresponding to a second time domain reuse pattern; and
  a transceiver for communicating information for said communication site.

20. The apparatus of claim 19, wherein said first portion is a dedicated portion and said second portion is a shared portion.

21. The method of claim 20, wherein said dedicated portion and said shared portion are divided into a plurality of time slots, and further comprises:
  means for categorizing each communication site according to a classifying SIR threshold;
  means for assigning each communication site a time slot in said time frame based on said categorization.

22. The method of claim 21, wherein each communication site is assigned said time slot in said time frame based on said categorization and an application at each communication site.

23. The apparatus of claim 22, wherein said categorizing means measures an average signal-to-interference ratio for each communication site in both said shared and said dedicated portions of said time frame, and categorizes each communication site by comparing said average signal-to-interference ratio with said classifying signal-to-interference ratio.

24. The apparatus of claim 23, wherein if said average signal-to-interference ratio for a communication in the shared portion is larger than said classifying threshold, then said communication site is assigned to a first category, and if the average signal-to-interference ratio in the dedicated portion is larger than said classifying signal-to-interference ratio, then said communication site is assigned to a second category, with all remaining communication sites assigned to a third category.

25. The apparatus of claim 22, wherein said communication site engaged in said application is assigned said time slot within a portion of said time frame based upon a Quality of Service requirement for said application.

26. The apparatus of claim 25, wherein said communication site engaged in said application requires a more stringent Quality of Service requirement and is assigned a higher priority than a communication site engaged in an application requiring a less stringent Quality of Service requirement.

27. The apparatus of claim 26, wherein said communication sites engaged in said more stringent Quality of Service requirement application are first assigned in said dedicated portion, with any remaining communication sites engaged in said more stringent Quality of Service requirement application assigned in said shared portion.

28. The apparatus of claim 27, wherein said communication sites engaged in said less stringent Quality of Service requirement application are assigned after said communication sites engaged in said more stringent Quality of Service requirement application, with said communication sites engaged in said less stringent Quality of Service requirement application belonging to said second category using said dedicated portion first, with any remaining communications sites engaged in less stringent Quality of Service requirement application in said first and second categories assigned in any remaining shared portion.

29. The method of claim 28, wherein said more stringent Quality of Service requirement application is voice communications, and said less stringent Quality of Service requirement application is data communications.

30. The apparatus of claim 29, further comprising:
  means for grouping communication sites by application;
  means for ordering each communication site within a group;
  means for prioritizing said groups;
  means for assigning time slots according to said prioritization of said groups; and
  means for monitoring assignment of communication sites to time slots and ensuring each terminal has fair access to the communication resource.

31. The apparatus of claim 19, wherein the communication system is a packet-switched system.

32. The apparatus of claim 19, wherein the communication sites are fixed.

33. The apparatus of claim 19, wherein the communication sites are mobile.

34. The apparatus of claim 19, wherein the communication system uses time division multiplexing for the downlink.

35. The apparatus of claim 19, wherein the communication system uses time division multiple access for the uplink.

36. The apparatus of claim 19, wherein said matching means matches a communication site to the reuse pattern which guarantees a Quality of Service requirement for each application provided by the system.

* * * * *